Patented Nov. 23, 1948

2,454,749

UNITED STATES PATENT OFFICE 2,454,749

LOWER ALKYL ESTERS OF ASCORBIC ACID

Edwin C. Wise, Kalamazoo, Mich., assignor to The Upjohn Company, Kalamazoo, Mich., a corporation of Michigan No Drawing. Application March 16, 1945, Serial No. 583,180

5 Claims. (Cl. 260—344.5)

This invention relates to esters of ascorbic acid and is more particularly concerned with the oil soluble tetra-lower aliphatic acid esters of ascorbic acid in which the number of carbon atoms in the alkyl radical is from two to seven, inclusive.

Ascorbic acid, vitamin C, is a water soluble compound possessing high anti-scorbutic activity. It is desirable to produce a compound with high anti-scorbutic properties which is soluble in oil so that it can be combined with the oil soluble vitamins such as vitamin A and vitamin D, which occur naturally in cod liver oil. Esterification of ascorbic acid will decrease the water solubility and increase the solubility in oil. The unstable enediol system between the second and third carbon atoms, however, makes esters of this type difficult to prepare and purify. German Patent 639,776 shows triacyl derivatives of ascorbic acid, prepared by treating a sodium salt of ascorbic acid with the appropriate acid chloride at temperatures of 80° to 90° centigrade, specifically 3.5.6-tripalmitoyl ascorbic acid and 3.5.6-trioleyl ascorbic acid. An extension of this field to the aromatic series comprising tribenzoyl ascorbic acid and triveratroyl ascorbic acid is represented by the disclosure in German Patent 701,561 and U. S. Patent 2,150,140. This reaction produces a low yield of the desired ester and only one of the hydroxyl groups in the enediol system is acylated.

I have now found that ascorbic acid will react quite readily at room temperature with the appropriate acid anhydride in the presence of anhydrous zinc chloride as a catalyst to form tetraesters of the lower alkyl series which are soluble in cod liver oil. The compounds were obtained in pure form as viscous liquids by distillation of the above reaction products at reduced pressure. The physical properties of these compounds were determined and they were analyzed for carbon and hydrogen, the results corresponding substantially to the theoretical values. These tetraesters thus isolated have strong anti-scorbutic properties as evidenced by feeding experiments.

The following examples are illustrative of my invention but are not to be construed as limiting in scope:

Example 1

Ten grams of fused zinc chloride was dissolved in 24 grams of acetic anhydride at room temperature and 10 grams of ascorbic acid was added thereto. The temperature of the solution increased somewhat as the reaction began but was maintained below about 50° centigrade by indirect cooling with ice water, until the initial evolution of heat had ceased, after which the reaction was allowed to go to completion at room temperature. This usually required about eighteen hours.

The reaction mixture was then dissolved in chloroform and the chloroform solution washed first with ice water and then with a 10 per cent solution of aqueous sodium bicarbonate. The chloroform residue was then dried over anhydrous sodium sulfate and chloroform removed by distillation at 10 to 15 millimeters pressure absolute. Thirteen and one-tenth grams of a crude, sirupy product was isolated and purified by distillation at an absolute pressure of 3 to 5 microns in a bath at a temperature of 180° to 185° centigrade. I obtained 8.3 grams of a water-white, highly viscous sirup, representing a yield of 42.8 per cent of theory, based on the ascorbic acid used. The sirup obtained was soluble in fish liver oils. The specific rotation was 89.9° using the D line of the sodium lamp at 28° centigrade with a concentration of 3.24 grams of the product in 100 milliliters of chloroform. An analysis of the compound showed 49.23 per cent of carbon and 4.80 per cent of hydrogen, which corresponds substantially to the theoretical values of 48.8 per cent and 4.69 per cent of carbon and hydrogen, respectively, in tetra-acetyl ascorbic acid, $C_{14}H_{16}O_9$.

Example 2

Tetra-propionyl ascorbic acid was prepared in the same way as outlined in Example 1. I used 15 grams of ascorbic acid, 60 grams of propionic anhydride and 15 grams of fused zinc chloride. This gave 29.8 grams of a crude product which distilled at 170° to 175° centigrade at 3 to 4 microns pressure absolute to give a light yellow viscous sirup. This product had a specific rotation of 64.5° using the D line of the sodium lamp at 28° centigrade in a concentration of 3.3 grams of the product to 100 milliliters of chloroform. On analysis, it was found to contain 54.05 per cent of carbon, corresponding substantially to the theoretical value of 54.0 per cent and 6.05 per cent of hydrogen, the same as the theoretical value.

Example 3

Tetra-butyryl ascorbic acid was similarly prepared by the method described in Example 1. A mixture of 15 grams of ascorbic acid was added to a solution of 15 grams of fused zinc chloride in 55 grams of butyric anhydride. Thirty-two grams of the crude product was obtained. This was distilled at 210° centigrade and 40 to 50 microns pressure absolute. The analysis showed 57.94 per cent carbon corresponding substantially to the theoretical value of 57.88 per cent and 6.91 per cent of hydrogen corresponding substantially to the theoretical value of 7.07 per cent.

*Example 4*

Tetra-caproyl ascorbic acid was prepared by the reaction of 2 grams of ascorbic acid with 11 grams of caproic anhydride, in the presence of 10 grams of fused zinc chloride. The crude product, comprising 5.5 grams, analyzed 62.15 per cent carbon and 8.24 per cent hydrogen corresponding substantially to the theoretical values of 63.35 per cent and 8.51 per cent respectively for $C_{30}H_{48}O_{10}$.

While I have disclosed four representative members of the new group of compounds, the tetra aliphatic esters such as tetra-valeryl, tetra-hexonyl and tetra-heptanoyl may be prepared by the same procedure and likewise possess similar anti-scorbutic and oil-soluble properties.

I claim:

1. A 2.3.5.6.-ascorbic acid tetra-ester of a lower aliphatic acid containing from two to seven carbon atoms, inclusive.
2. 2.3.5.6 tetra-acetyl ascorbic acid.
3. 2.3.5.6. tetra-propionyl ascorbic acid
4. 2.3.5.6. tetra-butyryl ascorbic acid.
5. The method of preparing a tetra ester of ascorbic acid including the step of reacting ascorbic acid with the anhydride of a lower aliphatic acid containing from two to seven carbon atoms, inclusive, in the presence of zinc chloride, and separating a tetra-ester of ascorbic acid from the reaction product.

EDWIN C. WISE.

REFERENCES CITED

The following references are of record in the file of this patent:

UNITED STATES PATENTS

| Number | Name | Date |
|---|---|---|
| 1,478,498 | Willkie | Dec. 25, 1923 |
| 2,150,140 | Warnat | Mar. 7, 1939 |
| 2,185,383 | Pasternack et al. | Jan. 2, 1940 |
| 2,207,680 | Helferich | July 9, 1940 |
| 2,350,435 | Wells et al. | June 6, 1944 |

FOREIGN PATENTS

| Number | Country | Date |
|---|---|---|
| 460,586 | Great Britain | Feb. 1, 1937 |
| 639,776 | Germany | Dec. 12, 1936 |

OTHER REFERENCES

"Organic Preparations," by Weygand-Interscience Pub. (1945), pages 180–181.

Chemical Abstracts, 1935, page 737, entitled "Methyl Ethers of Ascorbic Acid."

Outline of Organic Chemistry, 4th edition, revised, 1945, by Degering. Barnes & Noble Inc., Pages 89, 94–98.